United States Patent [19]

Mang

[11] 4,453,882
[45] Jun. 12, 1984

[54] LONGREACH LINEAR PICK-AND-PLACE ASSEMBLY APPARATUS

[75] Inventor: Josef Mang, Lindenhurst, Ill.

[73] Assignee: Emerson Electric Co., St. Louis, Mo.

[21] Appl. No.: 372,319

[22] Filed: Apr. 27, 1982

[51] Int. Cl.³ .................. B65G 65/00; F16H 25/12
[52] U.S. Cl. ................... 414/728; 414/680; 414/749; 198/486; 198/489; 74/53
[58] Field of Search .............. 414/222–225, 414/680, 715, 749, 718, 728, 729, 750–753; 198/486, 489; 74/51, 53, 54

[56] References Cited

U.S. PATENT DOCUMENTS

| Re. 29,797 | 10/1978 | Mink | 214/1 |
|---|---|---|---|
| 3,178,040 | 4/1965 | Nelson | 414/728 |
| 3,703,834 | 11/1972 | Beezer | 74/57 |
| 3,732,989 | 5/1973 | Cagle | 414/729 X |
| 3,751,996 | 8/1973 | Beezer | 74/53 |
| 3,779,089 | 12/1973 | Beezer | 74/53 |
| 3,818,769 | 6/1974 | Tigner et al. | 74/55 |
| 3,865,253 | 2/1975 | Healy | 214/1 |
| 3,881,362 | 5/1975 | Beezer | 74/53 |
| 3,921,820 | 11/1975 | Crockett | 214/1 |
| 3,988,938 | 11/1976 | Nagai | 74/53 |
| 4,036,374 | 7/1977 | Woltjen | 214/1 |
| 4,200,180 | 4/1980 | Dixon | 198/487 |
| 4,289,040 | 9/1981 | Haluko | 74/50 |

Primary Examiner—Leslie J. Paperner
Assistant Examiner—Terrance L. Siemens
Attorney, Agent, or Firm—McCaleb, Lucas & Brugman

[57] ABSTRACT

An assembly apparatus of the pick-and-place type having an elongated reach and including an intermittent motion drive mechanism having an output crank arm operable to stop at selected locations. A pivot plate assembly is rotatably journalled to the intermittent motion drive mechanism about the output thereof and capable of being drivably oscillated thereabout. A linkage slide assembly is carried by the pivot plate and comprises slide rods which are pivotally connected to the output crank arm of the intermittent motion drive mechanism for transmitting rotational oscillation into linear sliding movement. A cam member driven by the input of the intermittent motion drive mechanism and engages cam followers carried by the pivot plate assembly. Rotation of the cam member drivably oscillates the pivot plate thereby providing rotatable oscillation to the linearly reciprocating slide rods.

6 Claims, 3 Drawing Figures

LONGREACH LINEAR PICK-AND-PLACE ASSEMBLY APPARATUS

FIELD OF THE INVENTION

This invention relates to cam driven assembly devices, and more specifically to a linear pick-and-place assembly apparatus having an elongated reach.

DESCRIPTION OF PRIOR ART

Automated assembly mechanisms are becoming more commonplace as production speeds are increased and manufacturing economics require that production facilities become automated. One such automated assembly mechanism is the cam-driven, pick-and-place assembly device. Such devices typically utilize linearly slidable guide rods which are activated by an oscillating output arm of a cam-driven index mechanism. Such devices are capable of picking up workpieces from a supply source and depositing them at a work station, for example. Examples of such linear pick-and-place assembly devices are typified by U.S. Pat. Nos. 3,865,253, 3,881,362, and 4,289,040. Oftentimes the slider mechanisms for the slide rods of such prior art devices were directly mounted to the associated indexer mechanisms. In any event, many of such prior art assembly devices were not satisfactory in that they were incapable of pivotally placing a workpiece, i.e., they had no vertical stroke component, only a linear horizontal stroke.

An additional form of prior art device comprised a so-called trip-action air cylinder. In such devices the air cylinder's ram had a pivotal gripper mechanism which, upon extension of the ram to a desired point, was activated by a stop pin mechanism. This tripping would downwardly rotate the pivotal gripper mechanism which was mounted on the end of the ram thereby depositing a workpiece at the desired location. See for example, U.S. Pat. No. 4,200,180. Such prior art air cylinder devices, however, were disadvantageous in that they had inherent speed problems, i.e., they had limited output speeds as they tended to vibrate workpieces off the pivotal gripper at high speeds. Additionally, because such pivotal gripper devices had relatively short arm members compared to the overall length of the air cylinder's ram, the workpiece's vertical arc of travel when being deposited in the work station was quite large. Thus, the design of the workpiece and/or the work station for use with such pivotal gripper members had to accommodate large chordal actions.

SUMMARY OF THE INVENTION

The present invention comprises a linear pick-and-place assembly apparatus which provides a relatively long reach for the gripper mechanism carried thereby but which uses a simple, relatively small drive mechanism. Additionally, due to the minimal chordal action which occurs during the placement of a workpiece by the present invention, an expanded range of assembly operations is permitted.

Such features of the present invention are achieved through use of several major components. First is an intermittent motion drive mechanism. In the preferred embodiment this is a so-called two-stop, 180° indexer, i.e., a parallel plate cam type of index mechanism which provides a two-stop output. With such an indexer the oscillated output crank arm mounted is unidirectionally rotated but has intermittent stops at opposed locations. Multiple stops, of course, are possible depending upon the index cam's design. Second, a pivot plate assembly is rotatably journalled to the housing of the index drive mechanism and operable to freely pivot about the indexer's output shaft. Third, a linkage slide assembly is carried by the rotatable pivot plate and comprises elongated guide rods slidably mounted within ball slide devices. The slide rods are operable to move a gripper support mechanism attached thereto from a retracted or workpiece "pick-up" position to an extended or "place" position. The oscillated output crank arm of the index drive mechanism is pivotally connected to the slide rods to produce the two position linear output. Finally, a cam drive mechanism powered by the index drive's input drives cam followers carried by the rotatable pivot plate in a timed fashion. Those followers in turn drivably oscillate the rotatable pivot plate. This rotary oscillation in turn oscillates the slide rods and the gripper mechanism carried thereby in a plane normal to the axis of the indexer's output shaft. In effect, the slide rods and gripper mechanism can undergo both linear and rotary movements, whether performed simultaneously or consecutively.

Accordingly, it is a principal object of the present invention to provide a pick-and-place assembly apparatus having an intermediate pivot plate which produces a linearly actuated and rotatably oscillated output.

It is another object of the present invention to provide a longreach linear pick-and-place assembly apparatus which produces a minimal chordal action when depositing a workpiece at a work station.

It is yet a further object of the present invention to provide a linearly actuated assembly apparatus which provides a relatively long reach while utilizing minimal components.

It is a still further object of the present invention to provide a longreach linear pick-and-place assembly apparatus in which by changing cam and gear components the apparatus' overall output motion can be modified to accommodate differing assembly operations.

The means by which the foregoing and other objects of the present invention are accomplished and the manner of their accomplishment will be readily understood from the following specification upon reference to the accompanying drawings, in which.

DESCRIPTION OF PREFERRED EMBODIMENT

Figure 1:
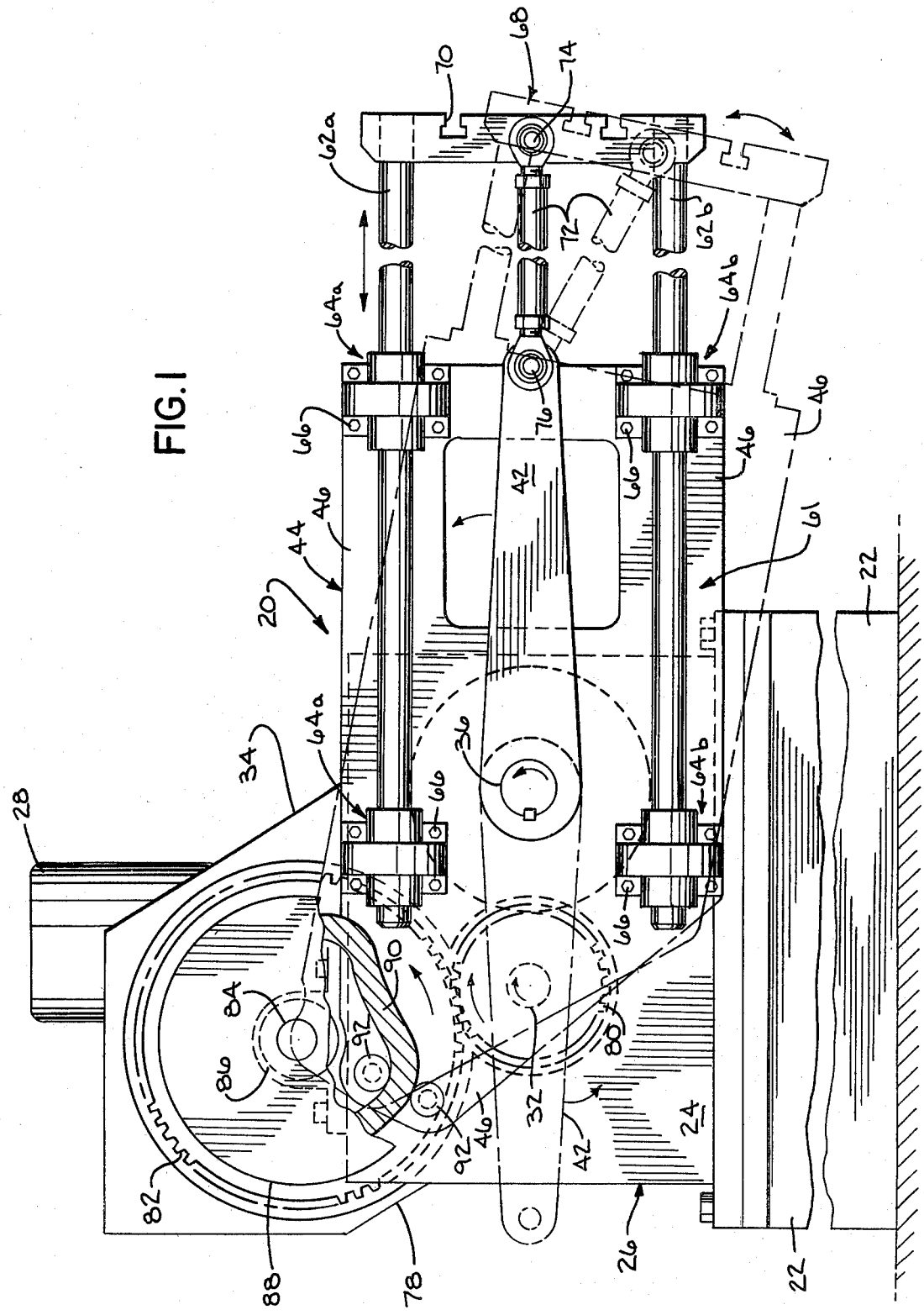
FIG. 1 is an elevation view of the linear longreach pick-and-lace assembly apparatus of the present invention depicting a floor stand mounting and showing various components in alternate positions.

Having reference to the drawings, wherein like reference numerals indicate corresponding elements, there is shown in FIG. 1 an illustration of the longreach linear pick-and-place assembly apparatus of the present invention, generally denoted by reference numeral 20, mounted on a floor stand 22. A housing 24 for an index drive mechanism, the latter unit generally denoted by reference numeral 26, is bolted to the floor stand 22. The combination of a motor 28 and a worm gear speed reducer 30 provides a constant speed unidirectional input rotation to the input shaft 32. The speed reducer 30 is supported by a gear housing 34 which in turn is mounted to the side of the index drive housing 24.

The index drive mechanism 26 can be of any of the well known types of cam-driven devices which produce an indexed or oscillated output. Preferably the indexer 26 is a parallel plate cam type of index drive assembly as is typified by U.S. Pat. No. 3,525,268. For purposes here, and as shown by reference to said U.S. Pat. No. 3,525,268, a parallel plate cam indexer mechanism utilizes an input shaft (shaft 32 of the present invention), a pair of parallel plate cams and a follower wheel mechanism (neither shown) which are both housed within indexer housing 24, and an output shaft (indexed output shaft 36 of the present invention) which is connected to the indexer's follower wheel mechanism. A collar 38 is rigidly affixed to oscillated output shaft 36 by a key 40 and carries an output crank arm 42.

It will be understood that any number of various stops or dwell positions for the oscillated crank arm 42 can be achieved by merely revising, in a well known fashion, the design of the parallel plate cams (not shown, but see U.S. Pat. No. 3,525,268) in index drive 26, or alternatively, the cam design of any other type indexer oscillator, or similar type mechanism which is selected for use as the intermittent motion drive device in the present invention. It also will be understood that the intermittent motion drive device's rotation need not be unidirectional for purposes of the present invention, i.e., the output could be oscillated back and forth rather than indexed in the same direction. In any event, in the preferred embodiment the so-called two-stop index drive mechanism 26 continuously oscillates the crank arm 42 in a counterclockwise direction between a left or retracted position (shown in phantom in FIG. 1) and a right or extended position (shown in solid in FIG. 1).

A pivot plate assembly, generally denoted by reference numeral 44, comprises a pivot plate 46 having a generally trapezoidal configuration (FIG. 1). A so-called four-point contact bearing 48 is utilized to rotatably mount the pivot plate 46 to the housing 24 of index drive 26. The four-point contact bearing, generally denoted by reference numeral 48 (FIG. 2), comprises a seal 50 which is first retained against an annular step in the rotatable pivot plate 46 by an outer ball bearing raceway 52. Raceway 52 is secured to plate 46 by threaded fasteners 54 and rotates therewith. The seal 50 is also retained against an inner annular support or stationary collar 56 formed as part of housing 24 by use of threaded fasteners 58 and a bearing retainer plate 60.

It will be understood that, through the advantageous use of the four-point contact bearing 48, the pivot plate 46 is permitted to freely rotate relative to the index drive housing 24 about the axis of output shaft 36 in a plane normal thereto. This rotation is best illustrated in FIG. 1 where the pivot plate 46 is shown in solid lines in a generally horizontal position. Plate 46 is also shown in phantom lines in a position where it has been slightly rotated in the clockwise direction about input shaft 36. It further will be understood that this rotation or rotary stroke of the pivot plate 46 of assembly apparatus 20 can be provided regardless of the stage of linear stroke of the elongated slide rods thereof. This is accomplished through use of a proper cam design, all as will be explained in more detail later herein.

Figure 2:
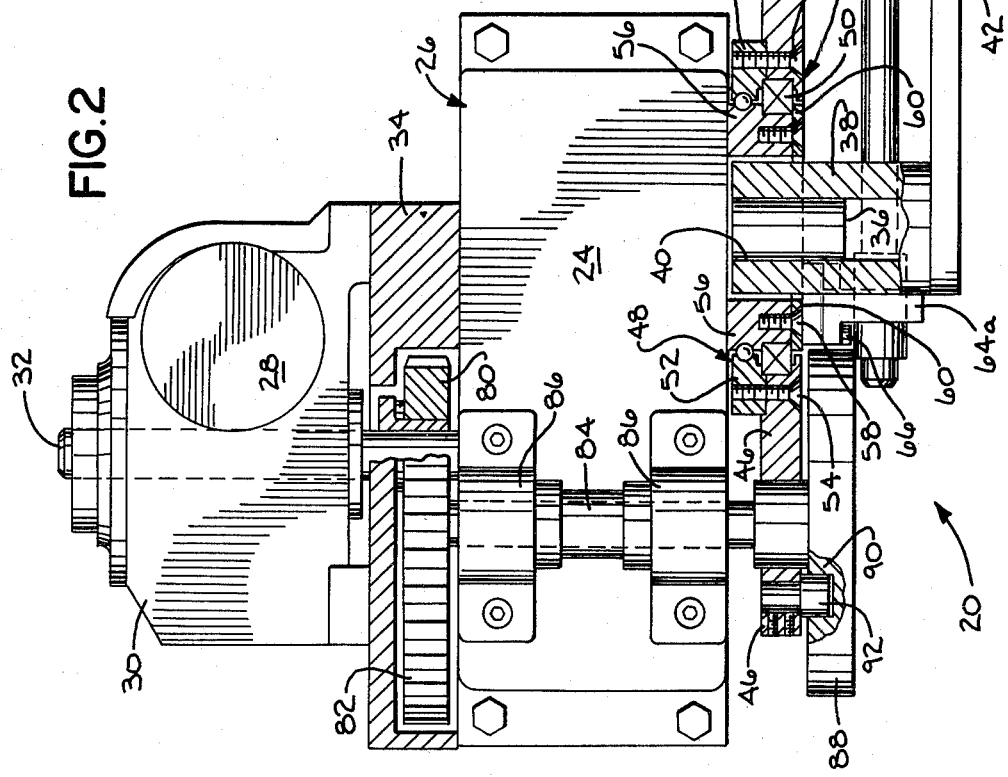
FIG. 2 is a plan view of the assembly apparatus of FIG. 1.

In FIGS. 1 and 2 there is illustrated a slide linkage assembly, which is generally denoted by reference numeral 61. Assembly 61 comprises a pair of elongated ball slide rods 62a, 62b which are respectively carried, i.e., linearly and slidably supported, by separate pairs of Ball Bushings (trademark) 64a, 64b. Such bushings in turn are respectively mounted to the pivot plate 46 by fasteners 66. In a well known manner, a gripper support mechanism, generally denoted by reference numeral 68, is carried at the ends of slide rods 62a, 62b. A pair of clamp channels 70 can be used to fasten any of the various well known types of gripper hand mechanisms (not shown) to the gripper support mechanism 68. If desired, channels 70 could be replaced with threaded holes for fasteners. A connector link 72 is pivotally connected at its right end (FIG. 2) by a pivot pin 74 to gripper support 68 and at its left end by a pivot pin 76 to the oscillating crank arm 42 of index drive 26. Through the pivotal connection of rods 62a, 62b to oscillated output arm 42 by connector link 72, it will be seen that the slide rods 62a, 62b are slidably and linearly reciprocated through the respective pairs of ball bushings 64a, 64b along the direction of the double-headed arrow shown in FIG. 1.

It is to be understood that in the preferred embodiment the length of the crank arm 42 can be 13", for example, thereby giving a linear stroke of 26" between pickup and place positions for a workpiece. Also, the end-to-end length of the slide rods 62a, 62b could be 48", for example. In any event, as is well known it is important that the ratio of the length of the connector link 72 to the crank arm 42 be at least a 3:1 ratio. This is necessary so as to effectively transfer the harmonic motion of the parallel plate drive cams (not shown) within the index drive mechanism 26 to the slide rods with a minimum distortion.

A cam drive assembly, generally denoted by reference numeral 78 (FIG. 1), is utilized to drivably oscillate the pivot plate 46 about the axis of output shaft 36. The cam drive assembly 78 comprises a pinion gear 80 which is secured to input shaft 32 and meshed against a driven gear 82; both of said gears are housed within gear housing 34. It will be noted that the ratio of diameters of gear 82 to gear 80 is approximately 2:1, the reason for which will be explained later herein. A jackshaft 84 mounted to the driven gear 82 is retained by pillow blocks 86 against the side of the indexer housing 24. A groove or so-called captured track cam 88 is affixed to jackshaft 84 at the end opposite driven gear 82 and carries an upstanding cam rib 90 (FIGS. 1 and 2). A pair of roller cam followers 92 are rigidly fastened to the left end (FIG. 2) of pivot plate 46 and extend downwardly therefrom towards the side of track cam 88 such that the cam rib 90 is captured and retained between the roller followers 92.

It will be understood that the relative size of cam rib 90 and the distance between the respective axes of the cam followers 92 are preferably designed such that the followers 92 are pre-loaded against the cam rib 90. This pre-loading is useful to prevent any so-called end play or backlash of the gripper mechanism and workpiece, i.e., the gripper and workpiece are relatively vibration-free during all segments of a given cycle of operation.

Turning to the operation of the present invention, it will be seen that a clockwise rotation of input shaft 32 produces a counterclockwise rotation of the output shaft 36 of indexer 26 (see arrows in FIG. 1). This in turn causes a counterclockwise rotation of crank arm 42 from the solid line or "placing" position of arm 42 to its left retracted or phantom "pick-up" position (both shown in FIG. 1). Such oscillation of crank arm 42 to the pick-up position causes the pivotal connector link 72 to retract the gripper support mechanism 68 and attached slide rods 62a, 62b. This in turn causes the slide rods 62a, 62b to be linearly slidably retracted from their solid line, fully extended positions (FIG. 1) to their retracted positions (not shown) within the ball bushings 64a, 64b. Continued indexing, i.e., counterclockwise rotation, of output shaft 36 effects the return of crank arm 42 to its solid line or placing position (FIG. 1) as well as the return of gripper support 68 to its extended position (solid line position in FIG. 1).

Additionally, it will be remembered that the pivot plate 46 is able to freely rotate about the axis of output shaft 36 due to the pivotal connection of pivot plate 46 and index drive housing 24 produced by the four-point contact bearing 48. The controlled oscillation or rotary rocking of pivot plate 46, thus, is provided by the cam drive assembly 78. Accordingly, clockwise rotation of input shaft 32 causes pinion gear 80 to rotate drive gear 82, jackshaft 84, and track cam 88 in a counterclockwise direction. The resulting rotation of cam rib 90 effects displacement of the cam followers 92 which in turn drivably oscillates pivot plate 46 about output shaft 36 between its solid line and its phantom line positons (FIG. 1). Such rotary oscillation of pivot plate 46 and ball bushings 64a, 64b thereby causes the slide rods 62a, 62b and gripper support 68 to be oscillated in a generally vertical direction, i.e., to undergo a rotary rocking motion between their perspective solid line and phantom line positions (FIG. 1).

It will be understood that the linear reciprocation of slide rods 62a, 62b produced by the continuous indexing of crank arm 42 along with the rotary oscillation of pivot plate 46 about output shaft 36 combine to provide the desired overall output motion for gripper support 68. It further will be understood that the exact timing and speed of linear reciprocation for slide rods 62a, 62b are controlled by the design of the particular cams used within index drive 26. Additionally, the rotary oscillation of pivot plate 46 is controlled by the specific design of cam rib 90 on cam 88. Thus, in a well known fashion, the linear pick-and-place assembly device of the present invention can be altered to meet the operating conditions of a specific workpiece assembly by changing the designs of its cam components. Further, the ratio of driven gear 82 to pinion gear 80 can be adjusted to establish the number of rotary oscillations of plate 46 for every complete cycle of linear travel of gripper support 68. In FIG. 1, the 2:1 ratio of gear 82 to gear 80 can be used to produce two oscillations (one downward and one upward) of plate 46 for each complete cycle of slide rods 62a, 62b, for example.

Figure 3:
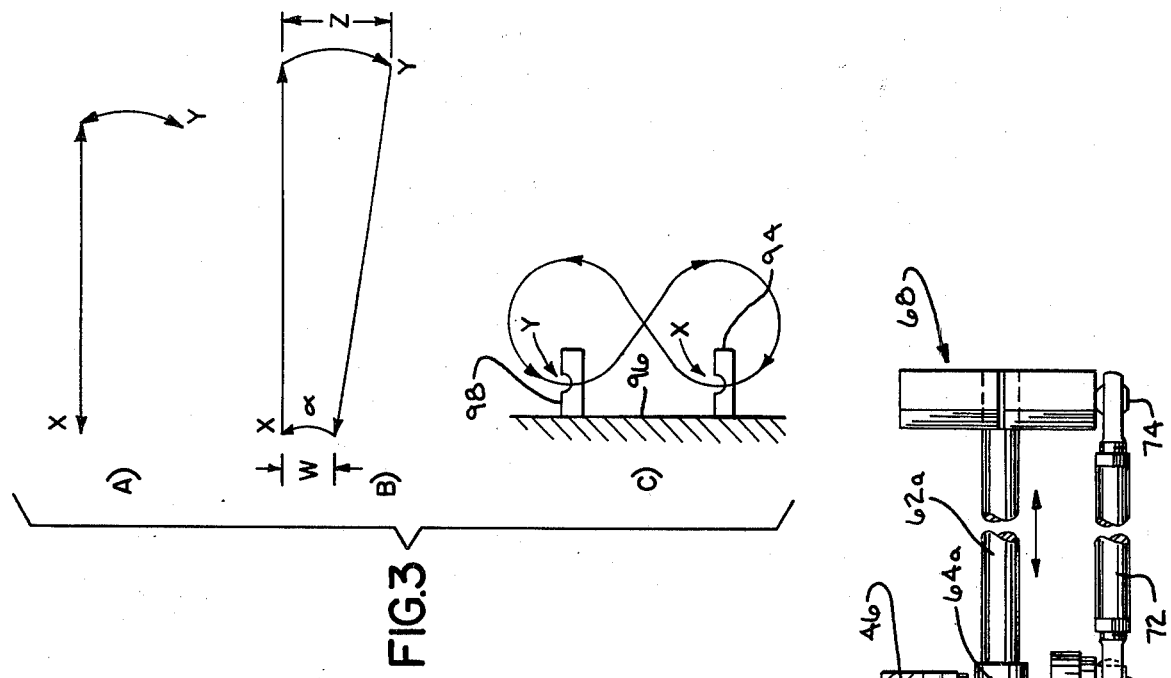
FIG. 3 depicts three alternate motion charts which illustrate the movement of the gripper mechanism for different assembly operations.

A few of the several output motions which can be produced by the present invention are shown in the motion charts of FIG. 3, wherein position "X" represents the workpiece pick-up position and position "Y" represents the placing position. As illustrated in FIG. 3-A, the workpiece is carried by gripper support 68 and transferred horizontally from position X to a full extension position (for slide rods 62a, 62b) whereat the track cam 88 has caused oscillation of pivot plate 46 which in turn produces the chordal action for gripper 68, i.e., vertical rotary oscillation, which is depicted in the right section of FIG. 3A. That chordal action continues until the workpiece is deposited at the placing position Y. A further cycling of the longreach linear pick-and-place assembly apparatus of the present invention returns the empty gripper support mechanism 68 through a generally vertical arcuate path whereafter it is horizontally transferred to its full retracted position ready to again pick up a workpiece (not shown) at position X. It will be understood that the workpiece movement chart depicted in FIG. 3-A might represent, for example, an assembly operation wherein a workpiece is manually placed in the gripper mechanism at position X and then automatically deposited in a work station at position Y.

In FIG. 3-B the workpiece is picked up at position X, linearly transferred to the right of the full extension position (of slide rods 62a, 62b), passed downwardly through a generally vertical chordal movement, and deposited at the placing position Y. A further operation of apparatus 20 causes the generally horizontal linear retraction (of slide rods 62a, 62b) until such time point as the pivot plate 46 is rotatably oscillated in a generally vertical direction whereupon the gripper support 68 is returned to the pick-up position X. The motion chart shown in FIG. 3-B could be for an apparatus 20 used in a fully automated assembly operation. There the gripper 68 automatically picks up a part at position X, then transfers and deposits it at position Y, and then returns to position X to begin the next cycle. By way of example, in an apparatus 20 having cam and gear components designed in a well known manner to provide the movements illustrated in FIG. 3-B, and having a crank arm and slide rods which are 13" and 48" in length respectively and an angular stroke αof 4° for pivot plate 46, the vertical distance "Z" (FIG. 3-B) or downward placing stroke is approximately 3.25" while the vertical distance "W" or upward pick-up stroke is approximately 1.5".

FIG. 3-C illustrates a side elevation of an assembly operation wherein the pick-up station X comprises a pair (only one shown) of workpiece support rungs 94 mounted to a wall 98 and which are separated by a sufficient distance to enable the gripper support 68 to be raised between such support rungs 94. The placing station Y also comprises a second pair (only one shown) of separated workpiece support rungs 98 mounted to wall 96. In this type of assembly operation, the gripper mechanism 68 of assembly apparatus 20 is, in effect, moved through a FIG. 8 pattern. That is, the workpiece is first picked up at position X, then the slide bars 62a, 62b and pivot plate 46 of apparatus 20 are so simultaneously reciprocated as to move the gripper support 68 and workpiece (not shown) upwardly to the next higher placing position, as is illustrated in FIG. 3-C, whereafter the gripper support 68 is returned to pick up another workpiece at the lower position X.

In any event, it is to be understood that any of the motions depicted in FIGS. 3-A through 3-C can be achieved with the longreach linear pick-and-place assembly apparatus of the present invention. Additionally, as is noted above, by well known modifications in the design of the various cam and gear components used in the present invention, any number of different pick-up and placing motions for gripper mechanism 68 can be achieved as are within the scope of such linear assembly devices.

It will be noted that, unlike some prior art devices, the present invention does not directly mount the ball bushings for the linear slide rods to the indexer housing. Such direct mounting does not permit any vertical oscillation component for the gripper mechanism. Instead, such prior art devices require a specialized pivotal gripper head such as is used in the prior trip-action air cylinder type linear assembly devices, however, those pivotal mechanisms are undesirable in that they produce severe chordal motions in placing a part. To overcome this problem, apparatus 20 of the present invention uses an intermediate rotatably-mounted pivot plate 46 to support the ball bushings 64a, 64b and slide rods 62a, 62b. Thus, with the present invention only a minimal chordal action is developed in placing a workpiece as the entire length of the elongated slide rods 62a, 62b and connector link 72 are used to transfer the rotary oscillation provided by pivot plate 46.

From the foregoing, it is believed that those skilled in the art will readily appreciate the unique features and advantages of the present invention over previous types of linear pick-and-place assembly apparatus. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

The embodiments of the invention in which an exclusive property or privilege is claimed are defined as follows:

1. A power driven, pick-and-place assembly apparatus for linearly transferring a workpiece through an elongated reach from one station to another, the apparatus comprising:

intermittent motion drive means having a rotating output crank arm operable to stop at multiple locations;

pivot plate means rotatably mounted to said intermittent motion drive means and operable to be drivably pivoted about the axis of rotation of said output crank arm;

slide linkage means carried by said pivot plate means and comprising elongated slide rod means slidably received for linear reciprocation within bushing means supported by said pivot plate means, said slide rod means characterized as being pivotally connected to said output crank arm; and cam drive means interconnected to said pivot plate means and operable to drivably oscillate the same between respective angularly rotated positions;

whereby rotation of said output crank arm of said intermittent motion drive device causes said slide rod means to be linearly reciprocated between respective positions, while operation of said cam drive means further causes said pivot plate means and said bushing means and slide rod means carried thereby to be rotatably oscillated.

2. The invention of claim 1, wherein said intermittent motion drive means comprises an index drive mechanism operable to oscillate said output crank arm between opposed locations.

3. The invention of claim 1, wherein said cam drive means comprises plate cam means driven by the input of said intermittent motion drive means and drivably engaged with roller follower means carried by said rotatable pivot plate means.

4. The invention of claim 3, and including gear transfer means driven by the input of said intermittent motion drive device means and operable to drive said plate cam means.

5. The invention of claim 1, and including gripper support means carried by said slide rod means.

6. A linear motion assembly apparatus of the pick-and-place type adapted to transfer a workpiece through an elongated reach between a first station and a second station, including a support housing, a power driven intermittent motion drive mounted within said housing and operable to drive an output crank arm between multiple stop positions, an intermediate pivot plate assembly comprising a pivot plate rotatably supported on said support housing and operable to pivot about the axis of rotation of said output crank arm, a slide linkage assembly mounted on said pivot plate and comprising bushing means slidably supporting elongated rod means, said elongated rod means pivotally connected to said output crank arm whereby the intermittent rotary motion of said crank arm is transferred into linear sliding reciprocation of said rod means, gripper support means carried by said elongated rod means, and cam drive means drivably engaging said rotatable pivot plate and operable to oscillate the same between respective rotary positions thereby to provide rotary oscillation to the linearly reciprocated rod means.

* * * * *

UNITED STATES PATENT AND TRADEMARK OFFICE
CERTIFICATE OF CORRECTION

PATENT NO. : 4,453,882
DATED : June 12, 1984
INVENTOR(S) : Josef Mang

It is certified that error appears in the above-identified patent and that said Letters Patent is hereby corrected as shown below:

In the Abstract, line 12, after "member" insert --is--.

Column 6, line 9, "of" should be --to--.

Signed and Sealed this

Twenty-third Day of October 1984

[SEAL]

Attest:

GERALD J. MOSSINGHOFF

Attesting Officer   Commissioner of Patents and Trademarks